United States Patent
Zhou et al.

(10) Patent No.: US 10,356,842 B2
(45) Date of Patent: Jul. 16, 2019

(54) REPEATER

(71) Applicant: DENSO CORPORATION, Kariya, Aichi-pref. (JP)

(72) Inventors: Zhuomin Zhou, Kariya (JP); Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 15/606,301

(22) Filed: May 26, 2017

(65) Prior Publication Data

US 2017/0367144 A1 Dec. 21, 2017

(30) Foreign Application Priority Data

Jun. 15, 2016 (JP) .................................. 2016-118914

(51) Int. Cl.
| | |
|---|---|
| *H04W 84/04* | (2009.01) |
| *H04B 1/52* | (2015.01) |
| *H04B 7/155* | (2006.01) |
| *H04B 7/26* | (2006.01) |
| *H04W 72/04* | (2009.01) |
| *H04W 84/12* | (2009.01) |

(52) U.S. Cl.
CPC ............ *H04W 84/047* (2013.01); *H04B 1/52* (2013.01); *H04B 7/15507* (2013.01); *H04B 7/15528* (2013.01); *H04B 7/2606* (2013.01); *H04W 72/0426* (2013.01); *H04W 84/12* (2013.01)

(58) Field of Classification Search
CPC ..... H04L 2012/40273; H04L 12/40006; H04L 12/66; H04L 67/12; H04L 12/4015; H04L 12/40013; H04L 2001/0094; H04L 12/12; H04L 2012/40234; H04L 2209/84; H04B 3/36
See application file for complete search history.

(56) References Cited

U.S. PATENT DOCUMENTS

| | | | | |
|---|---|---|---|---|
| 9,036,509 | B1 * | 5/2015 | Addepalli | H04W 4/046 370/259 |
| 2007/0274328 | A1 * | 11/2007 | Sonoda | H04B 3/36 370/401 |
| 2010/0031106 | A1 * | 2/2010 | Isoyama | H04L 1/0061 714/746 |
| 2010/0103859 | A1 * | 4/2010 | Isoyama | H04L 12/4015 370/315 |
| 2010/0169717 | A1 * | 7/2010 | Sonoda | H04L 12/437 714/48 |

(Continued)

*Primary Examiner* — Asad M Nawaz
*Assistant Examiner* — Najeeb Ansari
(74) *Attorney, Agent, or Firm* — Posz Law Group, PLC

(57) ABSTRACT

A repeater for transferring same-destination frames that are addressed to a destination Electronic Control Unit (ECU) efficiently by receiving the frames from respectively different ports, includes: four ports; and a switcher, wherein the first and second ports respectively originating a communication path to an individual ECU, and the third and fourth ports respectively connected to an individual ECU that is different from the one connected the first and second ports, and when the same-destination frames are received by the third and fourth ports of the repeater at the same time, the switcher distributes the same-destination frames among the first and second ports to be transferred via two, i.e., different, communication paths toward one, i.e., same, destination ECU.

11 Claims, 4 Drawing Sheets

(56) References Cited

U.S. PATENT DOCUMENTS

2010/0325639 A1* 12/2010 Isoyama ............. H04L 12/4015
719/313
2011/0035521 A1* 2/2011 Horihata ........... H04L 12/40013
710/106
2012/0303348 A1* 11/2012 Lu ...................... G05B 23/0235
703/13

* cited by examiner

| P1 | | P2 | | P3 | P4 |
|---|---|---|---|---|---|
| MAC ADDR. | HOPS | MAC ADDR. | HOPS | MAC ADDR. | MAC ADDR. |
| AD23 | 1 | AD23 | 3 | AD21 | AD22 |
| AD24 | 1 | AD24 | 3 | | |
| AD25 | 2 | AD25 | 2 | | |
| AD26 | 2 | AD26 | 2 | | |
| AD27 | 3 | AD27 | 1 | | |
| AD28 | 3 | AD28 | 1 | | |

REPEATER

CROSS REFERENCE TO RELATED APPLICATION

The present application is based on and claims the benefit of priority of Japanese Patent Application No. 2016-118914, filed on Jun. 15, 2016, the disclosure of which is incorporated herein by reference.

TECHNICAL FIELD

The present disclosure generally relates to a repeater for organizing a communication network.

BACKGROUND INFORMATION

For example, in a patent document, Japanese Patent Laid-Open No. 2010-509825 (patent document 1), an idea of frame transfer between the nodes via a shortest path in an Ethernet network is disclosed (Ethernet: registered trademark). The shortest path is a shortest communication path in which the number of repeaters through which the frames pass to reach a destination node (i.e., a relay number, or "HOPS") takes the minimum value.

In the repeater that adopts the idea of the patent document 1, when frames with the same address are received simultaneously from two or more ports, each of the received frames will be transmitted to the shortest communication path among two or more communication paths which lead to the node of the destination address. In such case, each of those frames are concentrated into one communication path.

Therefore, for example, when each frame is a large amount data frame, such as the one including a camera image data, it is highly possibly the case that the communication speed will be restricted to the maximum communication speed of the one of the plural communication paths. Further if such a restriction arises, each of the same address frames simultaneously received from two or more ports, i.e., the frames simultaneously transmitted from many nodes to the same address cannot be efficiently transmitted to the node of the destination address.

SUMMARY

It is an object of the present disclosure to provide a repeater that is capable of efficiently transferring frames that are simultaneously received from a plurality of ports.

One embodiment of the present disclosure includes a repeater having ports for receiving and transmitting frames. The repeater includes a first species port provided as at least two pieces of the first species port in one repeater respectively to connect with a first plurality of communication nodes, and a second species port provided as at least two pieces of the second species port in one repeater respectively to connect with at least two communication paths. The at least two communication paths respectively leads to a second plurality of communication nodes, and the second plurality of communication nodes is different from the first plurality of communication nodes that are respectively connected with the first species port.

The repeater also includes a distributive transferer transmitting frames having a same destination node that is reachable via either of the at least two communication paths, when the at least two pieces of the first species port simultaneously receive the frames having the same destination node.

Therefore, the same address frames, i.e., the frames having the same address, simultaneously received from a plurality of first species ports are efficiently transmittable.

More practically, since each of the same address frames is distributed to a plurality of communication paths, it is not likely, i.e., least possible, to have the maximum communication speed for the transmission of the frames in any of the communication paths to the destination address. Therefore, a communication speed restricted situation in which the total communication speed of the frames is restricted by the maximum communication speed of one of the plural communication paths is avoidable.

Numerals in the parentheses shown in the above and in the claims indicate relationships to concrete members/components in the following embodiments, thereby not restricting the technical scope of the present disclosure in any manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiments of the present disclosure are described with reference to the accompanying drawings.

1. First Embodiment

[1-1. Configuration]

Figure 1:
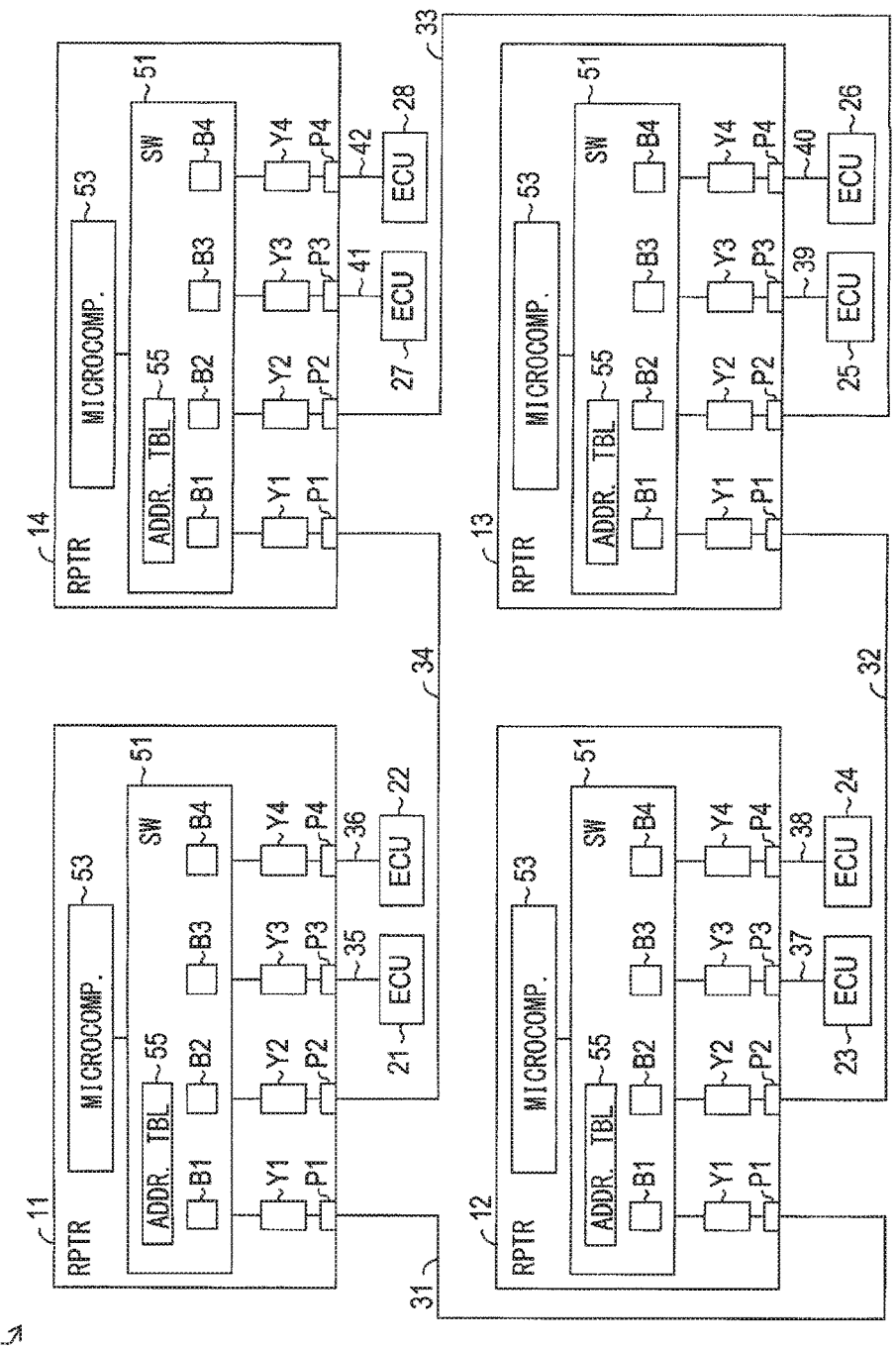
FIG. 1 is a block diagram of configuration of a communication network in a first embodiment of the present disclosure.

A communication network 1 of the first embodiment shown in FIG. 1 is the Ethernet network disposed in, for example, a vehicle, e.g., a passenger vehicle, and serves as a communications system in the vehicle.

As shown in FIG. 1, the communication network 1 is provided with repeaters 11-14, Electronic Control Units (ECUs) 21-28 respectively serving as a communication node, and communication lines 31-42.

The repeaters 11-14 are provided with a function to serve as an Ethernet switch to relay communications between the ECUs 21-28.

Further, the repeaters 11-14 are provided with a plurality of ports for transmitting and receiving frames. The repeaters 11-14 are provided with four ports P1-P4 in the example of the present embodiment. The repeaters 11-14 are provided with a switch part 51, respectively. The switch part 51 performs a relay process for relaying the communications according to the Ethernet standard.

The repeaters 11-14 are provided with Physical layer (PHY) sections Y1-Y4 for each of the ports P1-P4. The PHY sections Y1-Y4 respectively have a transmission function of converting transmission data from the switch part 51 to a communication signal transferred on the communication line and outputting the converted signal to a port corresponding to the PHY section concerned, and a reception function of converting, to the received data, the communication signal inputted from the port corresponding to the PHY section concerned and outputting the data to the switch part 51.

That is, the PHY sections Y1-Y4 are, respectively, hardware circuitry which functions as a transceiver. PHY is an abbreviation for a "physical layer."

The switch part 51 is provided with buffers B1-B4 for each of the ports P1-P4. Some areas in the buffers B1-B4 are used as a reception buffer in which the received data is stored. Some other areas or all the other areas other than above, i.e., other than reception buffers of the buffers B1-B4, are used as a transmission buffer in which the transmit data is stored.

Further, the switch part 51 is provided with a Media Access Control (MAC) address table 55. The MAC address table 55 is memorized by a memory that serves as a storage part for data storage which is not illustrated.

Although the switch part 51 is constituted by a digital circuit including many logic circuits, for example, it may be realized by a combination of the digital circuit and the analog circuit.

The switch part 51 may be primarily provided as a microcomputer of well-known type which has Central Processing Unit (CPU) and a semiconductor memory, e.g., Random Access Memory (RAM), Read-Only Memory (ROM), a flash memory and the like. In such case, various functions of the switch part 51 are realized when the CPU executes a program stored in the non-transitive, substantive storage medium.

In the example of the present embodiment, the above-mentioned semiconductor memory corresponds to the non-transitive, substantive storage medium for storing the program. Further, according to an executed program, a method corresponding to the executed program is performed.

Further, the switch part 51 may be provided as one microcomputer, or as a plurality of microcomputers.

The repeaters 11-14 are also respectively provided with a microcomputer 53 besides having the switch part 51. The microcomputer 53 performs a setup of various registers in the switch part 51, etc., for example.

Note that, regarding notations of the ports P1-P4, the PHY sections Y1-Y4, and the buffers B1-B4, assuming that "m" is one of the numbers 1 to 4, the PHY section Ym and the buffer Bm correspond to the port Pm.

In the communication network 1, a port P1 of the repeater 11 and a port P1 of the repeater 12 are connected by the communication line 31, and a port P2 of the repeater 12 and a port P1 of the repeater 13 are connected by the communication line 32.

Further, a port P2 of the repeater 13 and a port P2 of the repeater 14 are connected by the communication line 33, and a port P1 of the repeater 14 and a port P2 of the repeater 11 are connected by the communication line 34.

Further, the ECUs 21 and 22 are connected to a port P3 and a port P4 of the repeater 11 via communication lines 35 and 36, respectively, and the ECUs 23 and 24 are connected to a port P3 and a port P4 of the repeater 12 via communication lines 37 and 38, respectively.

The ECUs 25 and 26 are connected to a port P3 and a port P4 of the repeater 13 via communication lines 39 and 40, respectively, and the ECUs 27 and 28 are connected to a port P3 and a port P4 of the repeater 14 via communication lines 41 and 42, respectively.

That is, in other words, the port P1 and the port P2 of each of the repeaters 11-14 are connected to the port P1 and the port P2 of other repeater, thereby forming a ring shape of the repeaters 11-14. The ring shape may also be designated as a loop shape.

Further, the ECUs 21-28 respectively serving as a communication node are connected to the port P3 and the port P4 which are not used for ring shape connection among the ports P1-P4 of the repeater 11-14.

Therefore, as a communication path between the repeater 11-14, when the repeater 11 is considered as a start point, for example, two communication paths, of a left-handed, counter-clockwise rotation direction which is a direction from the repeater 11 to the repeater 12, and of a right-handed, clockwise rotation direction which is a direction from the repeater 11 to the repeater 14, exist.

Further, the two communication paths can function as the two communication paths for the communication between the ECUs 21-28 that are connected to two different repeaters 11-14.

In the following description, the ports P1 and P2, which are used for ring shape connection among the ports P1-P4 of each of the repeaters 11-14, i.e., a port of one repeater connected to other repeater, are respectively designated as a "ring port". Further, other ports in each of the repeaters 11-14, i.e., the ports P3 and P4, are respectively designated as a normal port.

On the other hand, the MAC address table 55 in each of the repeaters 11-14 registers, for each of the ports P1 to P4 of the subject repeater, a MAC address of the connected device connected to the ports P1 to P4.

In the following description and in FIG. 2, the MAC address of an ECU x is designated as "ADx".

Figures 2, 3:
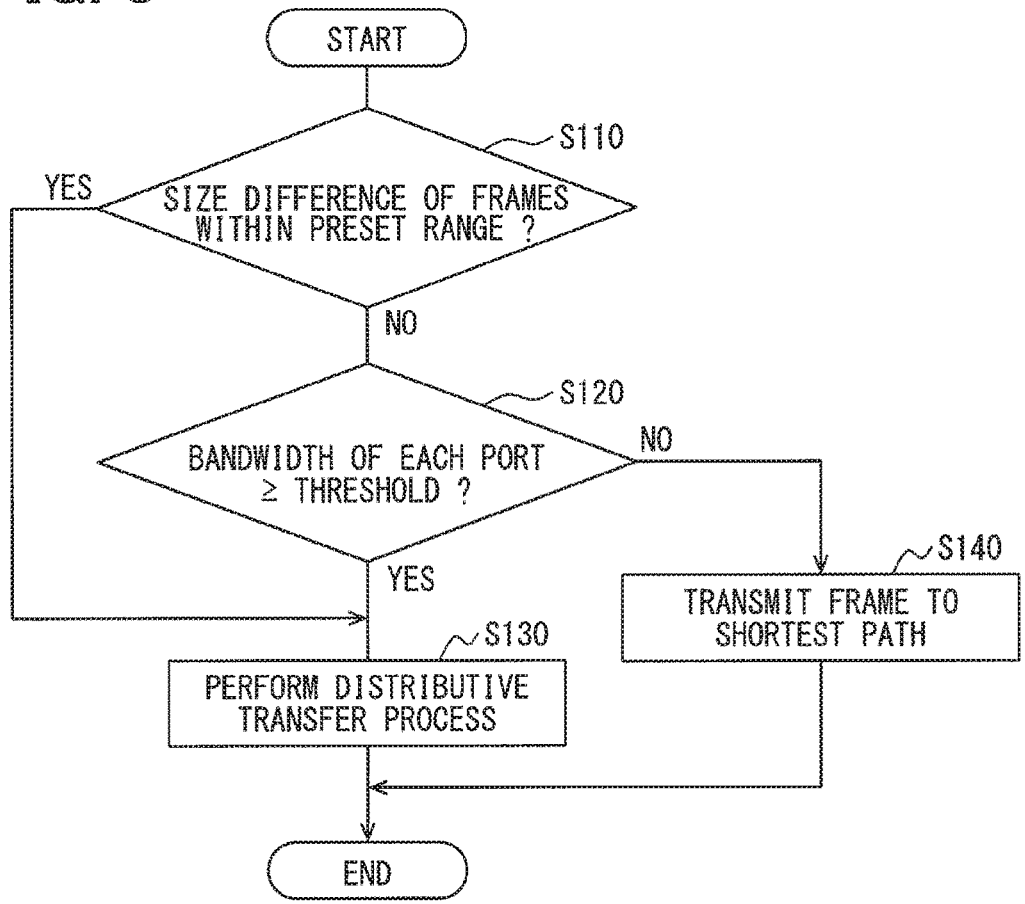
FIG. 2 is an illustration of an example of a MAC address table.
FIG. 3 is a flowchart of a distribution control process in the first embodiment of the present disclosure.

For example, as shown in FIG. 2, in the MAC address table 55 in the repeater 11, about the port P3, "AD21" which is the MAC Address of the ECU 21 is registered, and "AD22" which is the MAC Address of the ECU 22 is registered to the port P4.

Further, about each of the port P1 and the port P2, "AD23"-"AD28" which are the MAC Addresses of the ECUs 23-28 connected to the port P3 and the port and P4 of the other repeaters 12-14 are registered.

This is because the ECUs 23-28 are connected to the port P1 and to the port P2 of the repeater 11 via the other repeaters 12-14.

Further, in the MAC address table 55, the relay number is also registered as additional information of the MAC Address about each of the ring ports P1 and P2.

The relay number, or "HOPS" in FIG. 2, is a number of other repeaters through which the transmitted frame transmitted passes from a ring port of one repeater before arriving at the addressed, i.e., other repeater.

The address in this case is an ECU registered in the MAC Address table 55 in association with the relay number, i.e., "HOPS".

For example, as to "AD23" and "AD24", which are registered about the port P1, as shown in FIG. 2, in the MAC address table 55 of the repeater 11, "1" is registered as the relay number.

It is because one repeater 12 exists in the communication path, i.e., in a counter-clockwise communication path from the port P1 of the repeater 11 to the ECU 23 or to the ECU 24.

On the other hand, as to "AD23" and "AD24", which are registered about the port P2, "3" is registered as the relay number.

It is because three repeaters 12-14 exist in the communication path, i.e., in a clockwise communication path from the port P2 of the repeater 11 to the ECU 23 or to the ECU 24.

[1-2. Process]

The switch part 51 of each of the repeater 11-14 performs a distribution control process as shown in FIG. 3, while performing a relay process, e.g., filtering and flooding, according to the Ethernet standard.

In the following description, the repeater 11 is taken as an example and is described in terms of the distribution control process, the same process is performed in the other repeaters 12-14.

The switch part 51 of the repeater 11 performs the distribution control process of FIG. 3, when the same address frames are simultaneously received from the two normal ports P3 and P4.

The same address frames are, respectively, a frame having the same address of a communication node that is reachable via two communication paths that are connected to the ports P1 and P2.

The switch part 51 determines/recognizes the address of the frame based on, for example, a destination MAC address in the frame.

As shown in FIG. 3, after starting the distribution control process, in S110, the switch part 51 determines whether the difference of the sizes among the frames (i.e., size difference of the same address frames) received from the normal ports P3 and P4 is within a preset range that is set in advance.

The difference of the frame sizes is, more practically, an absolute value of the difference of the frame sizes.

The size of each frame is detectable from the size of the received data stored in each of the reception buffers corresponding to each of the ports P3 and P4.

In the switch part 51, when an affirmative determination is made in S110, the process proceeds to S130, but when a negative determination is made in S110, the process proceeds to S120.

The switch part 51 determines in S120 whether each of the ports P3 and P4 from which the frames are received has a bandwidth of equal to or greater than a threshold defined in advance. The bandwidth of each of the ports P3 and P4 is an actual transmission speed of each of the frames received from each of the ports P3 and P4. The switch part 51 can detect the transmission speed of the frames received from the port P3 (i.e., the bandwidth of the port P3) by measuring a per-unit-time increase of the received data stored in the reception buffer corresponding to the port P3.

Similarly, the switch part 51 can detect the transmission speed of the frames received from the port P4 (i.e., the bandwidth of the port P4) by measuring a per-unit-time increase of the received data stored in the reception buffer corresponding to the port P4.

When an affirmative determination of the switch part 51 is made in S120, the process proceeds to S130.

That is, when the switch part 51 determines that "the difference of each of the frames received from the port P3 and from the port P4 is within the preset range" in S110, or determines that "the communication speed of each of the frames received from the normal ports P3 and P4 are equal to or greater than the threshold" in S120, the process proceeds to S130.

The switch part 51 performs a distributive transfer process in S130.

The distributive transfer process of S130 is a process which distributes each frame received from the normal ports P3 and P4 to the two ring ports P1 and P2, and distributively transmits the frame to the two communication paths from the those ports P1 and P2.

Further, the distributive transfer process is a process of a distributive transferer.

More practically, in the distributive transfer process of S130, the switch part 51 transmits a frame having the maximum communication speed among the two same address frames received from the normal ports P3 and P4 to the shortest path among the two communication paths connected to the ports P1 and P2. Further, among the two same address frames received from the normal ports P3 and P4, a frame that does not have the maximum communication speed, i.e., a frame having a lower communication speed, is transmitted to a communication path that is not the shortest path.

Note that the shortest path is a communication path having the minimum relay number to the address.

The switch part 51 distinguishes the relay numbers based on the data of the relay numbers registered in the MAC address table 55.

That is, in the distributive transfer process of S130, from among the two same address frames, a frame having the n-th maximum communication speed is transmitted to a communication path of the n-th minimum relay number, when the number "n" is an integer of 1 or greater.

Then, the switch part 51 ends the distribution control process, after performing the distributive transfer process of S130.

Further, when a negative determination is made by the switch part 51 in S120, the process proceeds to S140.

In S140, the switch part 51 transmits the two same address frames received from the normal ports P3 and P4 to the shortest path among the two communication paths that are connected to the ports P1 and P2.

Further, the switch part 51 ends the distribution control process concerned thereafter.

On the other hand, when receiving, from one of the ports P3 and P4, a frame having an address of an ECU that is connected to the other repeater, the switch part 51 transmits such a frame to the shortest path among the two communication paths that are connected to the ports P1 and P2.

[1-3. Example Operation]

Assuming that, for example, the ECUs 21 and 22 connected to the ports P3 and P4 of the repeater 11 have simultaneously transmitted the same address frames addressed to the ECU 23. It is further assumed that the communication speed of the frame from the ECU 21 is higher than the communication speed of the frame from the ECU 22.

In such case, when (i) the difference of the sizes of the frames transmitted from the ECUs 21 and 22 is within the above-mentioned preset range or (ii) the communication speed of each of those frames is equal to or greater than the above-mentioned threshold, the switch part 51 of the repeater 11 performs the distributive transfer process of S130.

Then, according to the distributive transfer process, the switch part 51 transmits a frame having a higher communication speed among the two, i.e., a frame from the ECU 21, to the left-hand communication path from the port P1.

Further, the switch part 51 transmits a frame having a lower communication speed among the two, i.e., a frame from the ECU 22, to the right-hand communication path from the port P2.

It is because the relay number to the ECU 23 which is the address of the frame is "3" in the communication path from the port P2, while the relay number to the same destination ECU 23 in the communication path from the port P1 is "1".

[1-4. Effects]

According to the first embodiment described in full details above, the following effects are achieved.

(1a) When the same address frames are simultaneously received from two normal ports P3 and P4, the switch part 51 of the repeaters 11-14 distributes each of the same address frames to one of the two communication paths connected to the two ports P1 and P2, and transmits such frames.

Therefore, the same address frame simultaneously received from the two normal ports P3 and P4, i.e., the frame having the same destination address, can be transmitted efficiently.

Since each of the same address frames is distributed to one of the two communication paths, more specifically, it is least possible to have any of the communication paths to reach the maximum communication speed.

Therefore, the communication speed restricted situation in which the total communication speed of the frames is restricted by the maximum communication speed of one of the plural communication paths is avoidable.

(1b) In the distributive transfer process of S130, the switch part 51 transmits one frame having the maximum communication speed among the two same address frames received from the normal ports P3 and P4 to the shortest path among the two communication paths connected to the ports P1 and P2, and the other frame not having the maximum communication speed to the other communication path, i.e., to the path that is not the shortest.

That is, in other words, from among the two same address frames that are simultaneously received, a frame having the n-th maximum communication speed is transmitted to a communication path of the n-th minimum relay number.

Therefore, a frame having a higher communication speed is transmitted via a smaller relay number communication path. Thus, the possibility of having the communication speed reaching to an upper limit in each of the communication paths is further lowered. Further, the communication speed of the frame is best kept unchanged (i.e., un-lowered) from the maximum value from the one just after the transmission from the sender of the frame.

(1c) When the same address frames are simultaneously received from the ports P3 and P4, and an affirmative determination of the switch part 51 is made in any of S110 and S120 of FIG. 3, it is determined that a distribution operation condition is satisfied, and the switch part 51 performs the distributive transfer process of S130.

On the other hand, When a negative determination is made by the switch part 51 in both of S110 and S120 of FIG. 3, it is determined that the distribution operation condition is not satisfied, and the switch part 51 does not perform the distributive transfer process, but performs a process of a shortest path transferer that transmits each of the received same address frames in S140 of FIG. 3 to the shortest path.

That is, the switch part 51 determines whether the distribution operation condition is satisfied by the process of S110 and S120, and the distributive transfer process is permitted when it is determined that the distribution operation condition is satisfied, and the distributive transfer process is forbidden when it is determined that the distribution operation condition is not satisfied.

Further, when the distributive transfer process is forbidden, the process as the shortest path transferer is performed in S140.

Therefore, depending on whether the distribution operation condition is satisfied, whether a plurality of the same address frames are (i) distributed among a plurality of the communication paths for the transmission, or (ii) transmitted only to the shortest path among the plurality of communication paths.

(1d) The distribution operation condition includes a condition determined in S110, i.e., the first condition "the difference of the size of the same address frames is within the preset range".

Therefore, when the plurality of the same address frames of the same/similar size are simultaneously received, each of the same address frames can be distributed among the plurality of communication paths.

(1e) The distribution operation condition includes a condition determined in S120, i.e., the second condition "the communication speed of each of the same address frames is equal to or greater than the threshold".

Therefore, when the plurality of the same address frames respectively having a large transmission amount are simultaneously received, each of the same address frames can be distributed among the plurality of communication paths.

(1f) The distribution operation condition is a satisfaction of one of the first condition determined in S110 and the second condition determined in S120.

Therefore, both the effects described above under an item (1d) and under an item (1e) are achieved.

As a modification, the distribution operation condition may only be one of the above-mentioned first and second conditions determined in S110 and in S120, for example.

More specifically, in the distribution control process of FIG. 3, one of S110 and S120 may be deleted.

When deleting S120, the process may be configured to proceed to S140 when a negative determination is made in S110.

In the first embodiment, the ports P3 and P4 are equivalent to a first species port in the claims, and the ports P1 and P2 are equivalent to a second species port in the claims.

The switch part 51 functions as each of a distributive transferer, a determiner, and a shortest path transferer in the claims.

Further, in the distribution control process of FIG. 3, S110 and S120 are equivalent to a process of a determiner, S130 is equivalent to a process of a distributive transferer, and S140 is equivalent to a process of a shortest path transferer.

2. Second Embodiment

[2-1. Difference of the Second Embodiment from the First Embodiment]

The configuration of the second embodiment is basically the same as that of the first embodiment, with a difference discussed below.

The same numerals are used for the same components/configurations as the first embodiment, thereby not repeating the same descriptions.

[2-1-1. Configuration]

Figure 4:
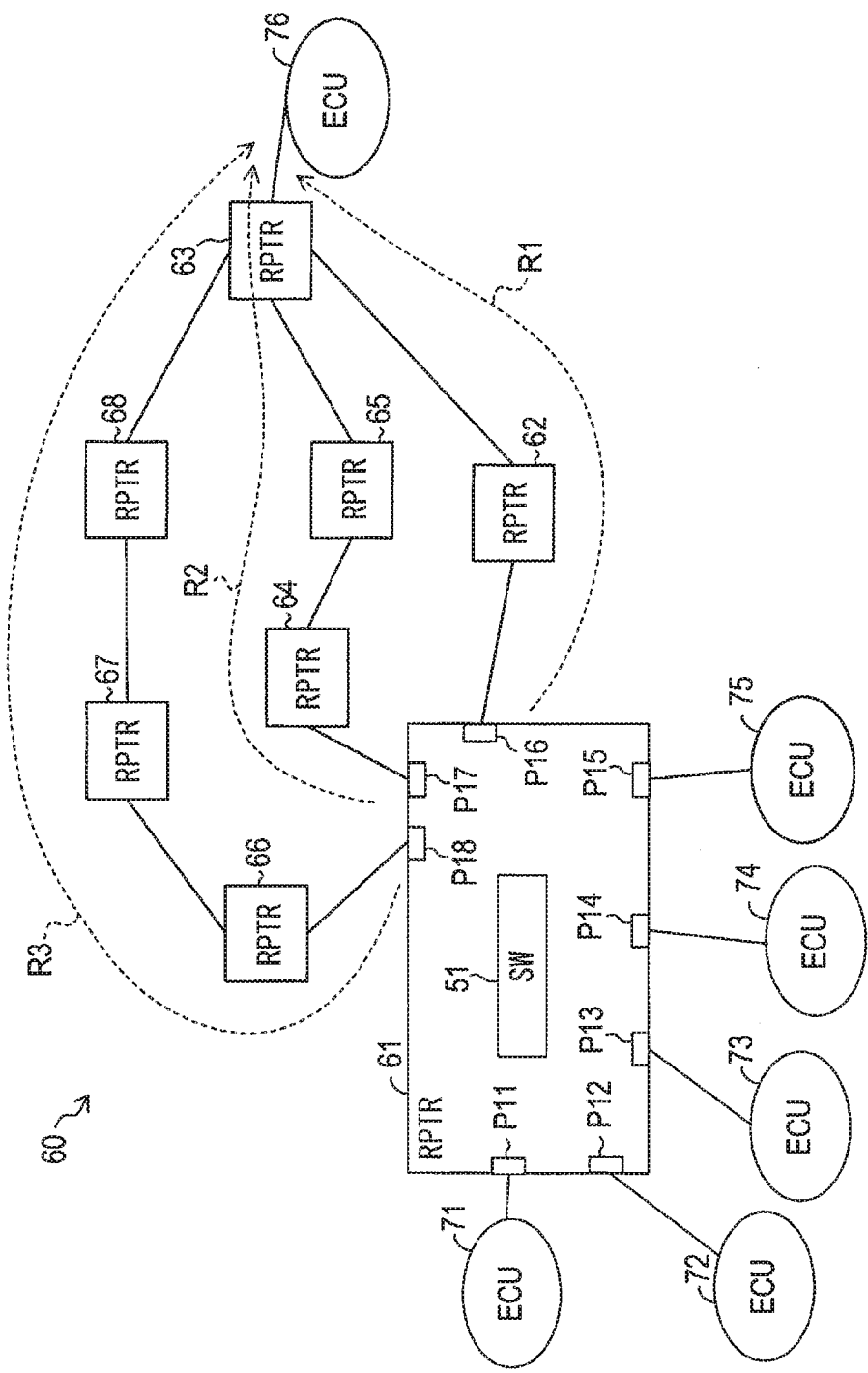
FIG. 4 is a block diagram of configuration of the communication network in a second embodiment of the present disclosure.

A communication network 60 of the second embodiment shown in FIG. 4 is provided with repeaters 61-68 and ECUs 71-76. The ECUs 71-75 are connected to the repeater 61. The ECU 76, which may be a destination address of the frame from the ECUs 71-75, is connected to the repeater 63. Further, at a position between the repeater 61 and the ECU 76, there are three communication paths, i.e., the first to third communication paths R1-R3.

The number of the repeaters, the ECUs, and the communication paths described above is an example.

The first communication path R1 is a path of "repeater 61→repeater 62→repeater 63→ECU 76." Therefore, the relay number in the communication path R1 from the repeater 61 to the ECU 76 is "2."

The second communication path R2 is a path of "repeater 61→repeater 64→repeater 65→repeater 63→ECU 76." Therefore, the relay number in the second communication path R2 from the repeater 61 to the ECU 76 R2 is "3."

The third communication path R3 is a path of "repeater 61→repeater 66→repeater 67→repeater 68→repeater 63→the ECU 76." Therefore, the relay number in the third communication path R3 from the repeater 61 to the ECU 76 is "4."

The repeater 61 has the similar configuration as the repeater 11 of the first embodiment, with at least 8 ports provided therein.

Among ports P11-P18 of the repeater 61, the ports P11-P15 respectively connected with the ECU 71-75 are the normal ports, just like the ports P3 and P4 of the first embodiment, and the ports P16-P18 respectively connected with the other repeaters 62, 64, and 66 are the ring ports, just like the ports P1 and P2 of the first embodiment. In other words, the ports P11-P15 are equivalent to a first species port in the claims, and the ports P16-P18 are equivalent to a second species port in the claims.

[2-1-2. Process]

The switch part 51 of the repeater 61 performs the distribution control process of FIG. 3 mentioned above, when the same address frames are simultaneously received from any two of the normal ports P11-P15.

In the example of FIG. 4, the same address frames that are received by the repeater 61 are addressed to reach the ECU 76.

In the second embodiment, there are three communication paths R1-R3 between the repeater 61 and the ECU 76.

Therefore, the switch part 51 transmits the frames received from two normal ports and not having the maximum communication speed, in the distributive transfer process of S130, to the second communication path R2 that has the second minimum relay number to the destination address among three communication paths R1-R3.

Further, as a modification, the frames not having the maximum communication speed may be transmitted to the third communication path R3 that has the third minimum relay number (i.e., that has the maximum relay number) to the destination address.

Figure 5:
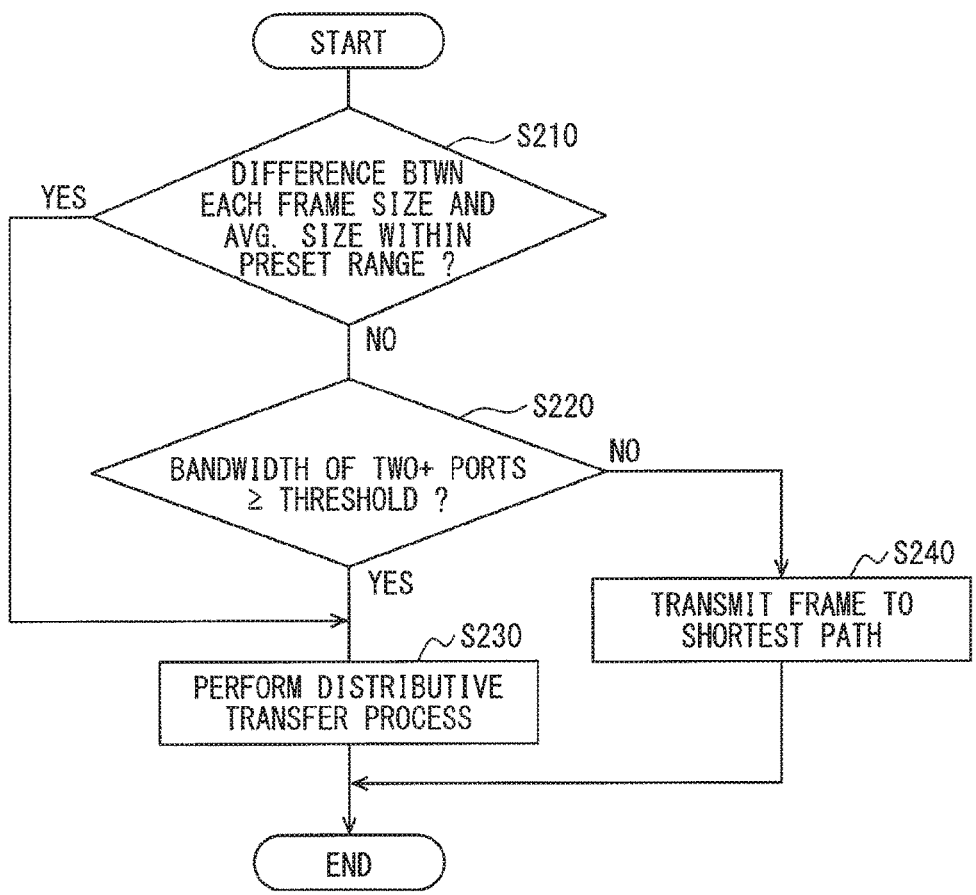
FIG. 5 is a flowchart of the distribution control process in the second embodiment of the present disclosure.

On the other hand, the switch part 51 of the repeater 61 performs a distribution control process shown in FIG. 5, when the same address frames are simultaneously received from three or more of the normal ports P11-P15.

As shown in FIG. 5, in S210, after starting the distribution control process, the switch part 51 determines whether all the differences between (i) the average value of the sizes of the frames received from three or more normal ports in S210 and (ii) the size of each frame are within the preset range.

When an affirmative determination is made by the switch part 51 in S210, the process proceeds to S230, but when a negative determination is made by the switch part 51 in S210, the process proceeds to S220.

The switch part 51 determines in S220 whether the bandwidth of at least two normal ports exceeds the threshold defined in advance among the three or more normal ports receiving the frames. That is, the switch part 51 determines in S220 whether the communication speed of the at least two same address frames is exceeding the threshold among the received three or more same address frames.

Then, when an affirmative determination is made by the switch part 51 in S220, the process proceeds to S230.

The switch part 51 performs the distributive transfer process of a first pattern or a second pattern in S230.

As for which of the two patterns of the distributive transfer process is performed in S230, a determination factor is whether the number of frame-receiving ports receiving the same address frames is greater than the number of available communication paths to the destination address, i.e., than three in this case (i.e., first to third:R1 to R3).

<Distributive Transfer Process of the First Pattern>

The switch part 51 performs the same process as S130 of FIG. 3, as the distributive transfer process of the first pattern, when the same address frames are simultaneously received from three normal ports (i.e., when the number of the received same address frames is three).

That is, the switch part 51 transmits, among the simultaneously-received three frames, the n-th maximum communication speed frame to the n-th minimum relay number communication path among the three communication paths R1-R3 to the destination address.

Therefore, in other words, a frame having the maximum communication speed is transmitted to the first communication path R1 having the shortest path that has the minimum relay number.

Further, a frame having the second maximum communication speed is transmitted to the second communication path R2 having the second minimum relay number.

Further, a frame having the third maximum communication speed (i.e., the minimum communication speed frame) is transmitted to the third communication path R3 having the third minimum relay number.

Note that, as a modification, a frame having the second maximum communication speed may be transmitted to the third communication path R3, and a frame having the third maximum communication speed may be transmitted to the second communication path R2.

<Distributive Transfer Process of the Second Pattern>

The switch part 51 performs the following process as the distributive transfer process of the second pattern, when the same address frames are simultaneously received from the number of normal ports which is greater than the number of communication paths R1-R3 (i.e., when the number of the received same address frames is four or more).

Here, the number of communication paths R1-R3 is set to "Z", and the number of normal ports simultaneously receiving the frame is set to "M."

In such case, a relation of "Z<M" is observed.

Then, the switch part 51 distributively transmits M pieces of the same address frames to the Z pieces communication paths in the following manner, based on the number of surplus in a division of M by Z.

That is, based on an assumption that the same address frames simultaneously received from the normal ports of M pieces, those frames are arranged in an order of the communication speeds, thereby designating the frames by the order from first to M-th, which may then be written as "m-th" maximum communication speed frame with the order number "m" ranging from 1 to M, when the number of surplus "S" of division of m by Z is a non-zero number, the S-th maximum communication speed frame is transmitted to the S-th minimum relay number communication path, and when the number of surplus "S" of division of m by Z is equal to zero, the S-th maximum communication speed frame is transmitted to the Z-th minimum relay number communication path, i.e., to the communication path of the maximum relay number.

Therefore, for example, when "M=5", since "Z=3", from among the five same address frames received, the first and the fourth maximum communication speed frames are transmitted to the first minimum relay number communication path R1. Further, the second and the fifth maximum communication speed frames are transmitted to the second minimum relay number communication path R2. Further, the third maximum communication speed frame is transmitted to the third minimum relay number communication path R3.

In case that "M=6", the sixth minimum communication speed frame is also transmitted to the third minimum relay number communication path R3.

Then, the switch part 51 ends the distribution control process concerned, after performing the distributive transfer process of S230.

When a negative determination is made by the switch part 51 in S220, the process proceeds to S240.

The switch part 51 transmits, in S240, each of the same address frames received from the normal ports just like S140 of FIG. 3 to the communication path R1 which is the shortest path among the three communication paths R1-R3.

Then, the switch part 51 ends the distribution control process concerned after S240.

On the other hand, the switch part 51 of the repeater 61 transmits the frame to communication path R1 which is the shortest path, also when the frame which made the ECU 76 the address is usually received from any one of the ports P11-P15.

As for the distribution control process of FIG. 5, S210 and S220 are equivalent to a process of a determiner in the claims, S230 is equivalent to a process of a distributive transferer in the claims, and S240 is equivalent to a process of a shortest path transferer in the claims.

[2-2. Effects]

(2a) According to the repeater 61 of the second embodiment, the same effects described above under item (1a) are achievable.

(2b) When the number of the ring ports P16-P18 and communication paths R1-R3 is set to (i.e., designated as) Z, the switch part 51 of the repeater 61 performs the same distributive transfer process as the first embodiment, when the same address frames are simultaneously received from N pieces of the normal ports, in which N is an integer number equal to or greater than 2 and smaller than or equal to Z.

In the present embodiment, since "Z=3", N is 2 or 3. That is, the switch part 51 transmits, from among the N pieces of the received same address frames, the n-th maximum communication speed frame to the n-th minimum relay number communication path among the communication paths of the Z pieces. Such an operation is realized by the distributive transfer process in S130 of FIG. 3 and the distributive transfer process of the first pattern in S230 of FIG. 5. Therefore, the same effects described above under item (1b) are achievable by the repeater 61 of the present embodiment.

Further, the switch part 51 of the repeater 61 performs the distributive transfer process of the second pattern in S230 of FIG. 5, when the same address frames are simultaneously received from M pieces of the normal ports, in which M is greater than Z.

Therefore, when the same address frames are simultaneously received from a greater number of the normal ports, which is greater than the number of communication paths R1-R3, the same effects described above under item (1b) are achieved.

(2c) The switch part 51 of the repeater 61 performs the distribution control process of FIG. 5, when the same address frames are simultaneously received from three or more of the normal ports P11-P15.

Further, in the distribution control process of FIG. 5, it is determined whether the distribution operation condition is satisfied by the process of S210 and S220, and, when it is determined that the distribution operation condition is satisfied, the switch part 51 permits the distributive transfer process of S230 to be performed.

When it is determined that the distribution operation condition is not satisfied, the switch part 51 prohibits the distributive transfer process, and performs the process of the shortest path transferer in S240.

Therefore, the same effects described above under item (1c) are achievable.

(2d) The distribution operation condition determined in the distribution control process of FIG. 5 includes the conditions determined in S210, i.e., the first condition "all the differences between (i) the average value of the sizes of the frames received from three or more normal ports in S210 and (ii) the size of each frame are within the preset range".

Therefore, when the same address frames are simultaneously received from three or more the normal ports, the same effects described above under item (1d) are achievable.

(2e) The distribution operation condition determined in the distribution control process of FIG. 5 includes the conditions determined in S220, i.e., the second condition "bandwidth of at least two normal ports exceeds the threshold defined in advance among the three or more normal ports receiving the frames".

Therefore, when the same address frames are simultaneously received from three or more the normal ports, the same effect described above under item (1e) are achievable.

(2f) The distribution operation condition determined in the distribution control process of FIG. 5 is the condition that at least one of the above-mentioned first condition determined in S210 and the above-mentioned second condition determined in S220 is satisfied.

Therefore, the same effects described under both of item (2d) and item (2e) are achievable.

As a modification, the distribution operation condition determined in the distribution control process of FIG. 5 may only be either one of the above-mentioned first condition determined in S210 and the above-mentioned second condition determined in S220, for example.

More practically, in the distribution control process of FIG. 5, one of S210 and S220 may be deleted.

When S220 is deleted, it may be configured that a negative determination made in S210 leads to S240.

3. Other Embodiments

Although the present disclosure has been described in connection with preferred embodiment thereof with reference to the accompanying drawings, it is to be noted that various changes and modifications will become apparent to those skilled in the art.

For example, the communication networks 1 and 60 of the above-mentioned embodiments may be the communication networks for use in a device other than a vehicle.

Further, in the communication network 60 of the second embodiment, the number of the communication paths from the repeater 61 to the ECU 76 may be, for example, two or four or more.

A couple of functions of one element in the above embodiments may also be born by two or more elements, and vice versa. One function realized by plural elements in the above embodiments may also be realized by only one element, and vice versa.

A part of each of the above embodiments may be omitted, or may be added to other embodiments, or may be replaced with a part of each of the other embodiments.

The inventive concept of the repeater described above may also be implemented as (i) a communication network having such repeaters, (ii) a program controlling a computer to be serving as such repeaters, (iii) a non-transitive memory medium storing such a program, (iv) a repeating method for repeating frames or the like.

Such changes, modifications, and summarized schemes are to be understood as being within the scope of the present disclosure as defined by appended claims.

What is claimed is:

1. A repeater, comprising:
    ports for receiving and transmitting frames, including
    a first species port, provided as at least two pieces of the first species port in one repeater respectively to connect with a first plurality of communication nodes;
    a second species port, provided as at least two pieces of the second species port in the one repeater respectively to connect with at least two communication paths, the at least two communication paths respectively leading to a second plurality of communication nodes, the second plurality of communication nodes being different from the first plurality of communication nodes that are respectively connected with the first species port; and
    a distributive transferer transmitting frames having a same destination node that is reachable via either of the at least two communication paths, when the at least two pieces of the first species port simultaneously receive the frames having the same destination node, wherein
    the distributive transferer transmits, via a minimum-repeat path, simultaneously-received same-destination max-speed frames that (i) are simultaneously received by N pieces of the first species port, (ii) have the same destination node, and (iii) have a maximum communication speed, when:
    (a) a number of the at least two pieces of the second species port and a number of the communication paths are respectively designated as an integer number Z;
    (b) a number of the at least two pieces of the first species port simultaneously receiving the same-destination frames are designated as an integer number N that is equal to or less than Z;
    (c) the minimum-repeat path allows the frames to reach the destination node via a minimum number of repeaters among Z pieces of the communication paths;
    (d) the same-destination max-speed frame(s) are:
        (i) chosen from among N pieces of the simultaneously-received frames simultaneously received by the N pieces of the first species port, and
        (ii) transmitted via the minimum-repeat path among the Z pieces of the communication paths; and
    (e) other same-destination frame(s) other than the same-destination max-speed frames among the N pieces of the simultaneously-received frames are:
        simultaneously received by the N pieces of the first species port, and
        transmitted via the communication path(s) other than the minimum-repeat path among the Z pieces of the communication paths.

2. The repeater of claim 1, wherein the distributive transferer transmits, from among the N pieces of the simultaneously-received same-destination frames, n-th max-speed frame(s) having an n-th communication speed from the maximum communication speed via an n-th minimum-repeat path, on which a number of repeaters provided on such communication path are n-th from a minimum among Z.

3. The repeater of claim 1, wherein
    when a number of simultaneously-received same-destination frames simultaneously received by the at least two pieces of the first species port is designated as an integer number M greater than Z, the distributive transferer:
    (i) designates the frames as m-th maximum communication speed frames according to maximum communication speed from 1st to M-th, the 1st maximum communication speed frame being the fastest communication speed frame and the M-th maximum communication speed frame being the slowest communication speed frame;
    (ii) designates the communication paths as z-th minimum relay number communication paths according to fewest number of relays to the destination node from 1st to Z-th, the $1^{st}$ minimum relay number communication path having the fewest number of relays and the Zth minimum relay number communication path having the most number or relays;
    (iii) for each m-th maximum communication speed frame, performing an m modulo "Z" operation speed frame and designating a result as an S result defined in the range from 0 to (Z−1); and
    (iv)
        (a) when the S result for the m modulo Z operation for a respective m-th maximum communication speed frame is non-zero, transmitting the respective m-th maximum communication speed frame on the z-th minimum relay number communication path where z is equal to S, and
        (b) when the S result for the m modulo Z operation for the respective m-th maximum communication speed frame is zero, transmitting the respective m-th maximum communication speed frame on the z-th minimum relay number communication path where z is equal to Z.

4. The repeater of claim 1 further comprising:
    a determiner configured to:
    (1) determine whether the same-destination frames respectively satisfy a preset distribution condition, when the at least two pieces of the first species port simultaneously receive the same-destination frames;
    (2) allow the distributive transferer to perform a distributive transfer operation, distributively transfer the same-destination frames, upon determining that the same-destination frames respectively satisfy the preset distribution condition; and
    (3) prohibit the distributive transferer from performing the distributive transfer operation, upon determining that the same-destination frames do not satisfy the preset distribution condition; and
    a shortest path transferer configured to transmit the same-destination frames via a minimum-repeat path that allows the same-destination frames to reach the destination node via a minimum number of repeaters among the at least two communication paths, when the determiner prohibits the distributive transferer to perform the distributive transfer operation.

5. The repeater of claim 4, wherein
the distribution condition, at a time when the at least two pieces of the first species port simultaneously receive the same-destination frames, includes, among other conditions, a condition that a difference of frame sizes among the same-destination frames received thereby is within a preset range.

6. The repeater of claim 4, wherein
the distribution condition, at a time when the at least two pieces of the first species port simultaneously receive the same-destination frames, includes, among other conditions, a condition that a communication speed of each of the same-destination frames received by the at least two pieces of the first species port is equal to or greater than a preset threshold value.

7. The repeater of claim 4, wherein
the distribution condition at a time when the at least two pieces of the first species port simultaneously receive the same-destination frames is a satisfaction of one of:
a first condition that a difference of frame sizes among the same-destination frames received by the at least two pieces of the first species port is within a preset range, and
a second condition that a communication speed of each of the same-destination frames received by the at least two pieces of the first species port is equal to or greater than a preset threshold value.

8. The repeater of claim 4, wherein
the distribution condition, at a time when three or more pieces of the first species port simultaneously receive the same-destination frames, includes a condition that a difference between (i) an average of the frame sizes of the same-destination frames received by the three or more pieces of the first species port and (ii) a frame size of each of the same-destination frames is within a preset range.

9. The repeater of claim 4, wherein
the distribution condition at a time when three or more pieces of the first species port simultaneously receive the same-destination frames includes a condition that a communication speed of at least two same-destination frames is equal to or greater than a threshold value.

10. The repeater of claim 4, wherein:
the distribution condition at a time when three or more pieces of the first species port simultaneously receive the same-destination frames is a satisfaction of one of a first condition or a second condition, and
the first condition setting that a difference between (i) an average of the frame sizes of the same-destination frames received by the three or more pieces of the first species port, and (ii) a frame size of each of the same-destination frames is always contained within a preset range, and the second condition setting that a communication speed of at least two same-destination frames is equal to or greater than a threshold value.

11. A communication network system, comprising:
a repeater, having ports for receiving and transmitting frames, the repeater including:
a first species port, provided as at least two pieces of the first species port in one repeater respectively to connect with a first plurality of communication nodes;
a second species port, provided as at least two pieces of the second species port in the one repeater respectively to connect with at least two communication paths, the at least two communication paths respectively leading to a second plurality of communication nodes, the second plurality of communication nodes being different from the first plurality of communication nodes that are respectively connected with the first species port; and
a distributive transferer transmitting frames having a same destination node that is reachable via either of the at least two communication paths, when the at least two pieces of the first species port simultaneously receive the frames having the same destination node, wherein
the distributive transferer transmits, via a minimum-repeat path, simultaneously-received same-destination max-speed frames that (i) are simultaneously received by N pieces of the first species port, (ii) have the same destination node, and (iii) have a maximum communication speed, when:
(a) a number of the at least two pieces of the second species port and a number of the communication paths are respectively designated as an integer number Z;
(b) a number of the at least two pieces of the first species port simultaneously receiving the same-destination frames are designated as an integer number N that is equal to or less than Z;
(c) the minimum-repeat path allows the frames to reach the destination node via a minimum number of repeaters among Z pieces of the communication paths;
(d) the same-destination max-speed frame(s) are:
   (i) chosen from among N pieces of the simultaneously-received frames simultaneously received by the N pieces of the first species port, and
   (ii) transmitted via the minimum-repeat path among the Z pieces of the communication paths; and
(e) other same-destination frame(s) other than the same-destination max-speed frame(s) among the N pieces of the simultaneously-received frames are:
   simultaneously received by the N pieces of the first species port, and
   transmitted via the communication path(s) other than the minimum-repeat path among the Z pieces of the communication paths.

* * * * *